United States Patent
Smus

(10) Patent No.: US 9,239,648 B2
(45) Date of Patent: Jan. 19, 2016

(54) DETERMINING USER HANDEDNESS AND ORIENTATION USING A TOUCHSCREEN DEVICE

(71) Applicant: Google Inc., Mountain View, CA (US)

(72) Inventor: Boris Smus, San Francisco, CA (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 14/215,219

(22) Filed: Mar. 17, 2014

(65) Prior Publication Data

US 2015/0261373 A1  Sep. 17, 2015

(51) Int. Cl.
  G06F 3/041  (2006.01)
  G06F 3/044  (2006.01)
  G06F 3/0488  (2013.01)

(52) U.S. Cl.
  CPC .............. *G06F 3/0416* (2013.01); *G06F 3/044* (2013.01); *G06F 3/04883* (2013.01)

(58) Field of Classification Search
  CPC .... G06F 3/0416; G06F 3/044; G06F 3/04883
  USPC .................................................. 345/173, 174
  See application file for complete search history.

(56) References Cited

U.S. PATENT DOCUMENTS

| | | | |
|---|---|---|---|
| 6,630,922 B2 | 10/2003 | Fishkin et al. | |
| 8,497,847 B2 | 7/2013 | Brisebois et al. | |
| 8,644,884 B2 | 2/2014 | Sheynblat et al. | |
| 8,760,426 B1 | 6/2014 | Strand et al. | |
| 8,983,539 B1 * | 3/2015 | Kim et al. | 455/557 |
| 2005/0168399 A1 * | 8/2005 | Palmquist | 345/1.1 |
| 2009/0167702 A1 | 7/2009 | Nurmi | |
| 2011/0014956 A1 * | 1/2011 | Lee et al. | 455/569.1 |
| 2011/0291969 A1 | 12/2011 | Rashid et al. | |
| 2012/0262407 A1 * | 10/2012 | Hinckley et al. | 345/173 |
| 2013/0107674 A1 * | 5/2013 | Gossweiler et al. | 368/10 |
| 2013/0135223 A1 * | 5/2013 | Shai | 345/173 |

(Continued)

FOREIGN PATENT DOCUMENTS

| | | |
|---|---|---|
| EP | 2662756 | 11/2013 |
| WO | 2013019400 | 2/2013 |

OTHER PUBLICATIONS

International Search Report and Written Opinion in International Application No. PCT/US2015/020534, mailed Jun. 9, 2015, 10 pages.

(Continued)

*Primary Examiner* — Dmitriy Bolotin
(74) *Attorney, Agent, or Firm* — Fish & Richardson P.C.

(57) ABSTRACT

The present disclosure provides techniques for determining the position and/or orientation of a pointing device relative to the screen on a touchscreen device. A method may include receiving first orientation data from a first device that may include a capacitive touch surface. A touch point may be received indicating a location of a touch by a user on the capacitive touch surface. Second orientation data may be received from a second device. The first and second orientation data may be correlated to determine a relative orientation of the first device to the second device. A position of a pointing device may be determined based on the touch point and the relative orientation of the first and second devices. Additionally, multiple distances relative to a capacitive touch surface may be received, and based on the multiple distances, a position of a user's finger, hand, and/or arm may be determined.

20 Claims, 8 Drawing Sheets

(56) References Cited

U.S. PATENT DOCUMENTS

| | | |
|---|---|---|
| 2013/0162558 A1 | 6/2013 | Huang |
| 2014/0015810 A1* | 1/2014 | Chau .............................. 345/179 |
| 2014/0028578 A1 | 1/2014 | Dinh et al. |
| 2014/0035884 A1* | 2/2014 | Oh et al. ........................ 345/179 |
| 2014/0282269 A1* | 9/2014 | Strutt et al. ................... 715/863 |

OTHER PUBLICATIONS

Goel, Mayank et al.,"GripSense: Using Built-In Sensors to Detect Hand Posture and Pressure on Commodity Mobile Phones", UIST '12, Oct. 7-10, 2012, Cambridge, Massachusetts, USA.

Kin, K. et al.,"Determining the Benefits of Direct-Touch, Bimanual, and Multifinger Input on a Multitouch Workstation", In Proc. Graphics Interface, pp. 119-124, Toronto, 2009, CIP.

Rofouei, Mahsan et al.,"Your Phone or Mine? Fusing Body, Touch and Device Sensing for Multi-User Device-Display Interaction", CHI'12, May 5-10, 2012, Austin, Texas, USA.

Westerman, Wayne,"Hand Tracking, Finger Identification, and Chordic Manipulation on a Multi-touch Surface", University of Delaware, 1999.

* cited by examiner

DETERMINING USER HANDEDNESS AND ORIENTATION USING A TOUCHSCREEN DEVICE

BACKGROUND

When a user interacts with a touchscreen device, it can be determined which part of the screen the user is touching based on capacitive properties of the touchscreen display. In general, however, it is very difficult to determine additional information about the user's interaction with the touchscreen using conventional techniques. For example, knowing which hand is being used by the user and the orientation of the user's hand relative to the touchscreen can be difficult to determine.

BRIEF SUMMARY

According to an embodiment of the disclosed subject matter a method may include receiving first orientation data associated with a first device and the first device may include a capacitive touch surface. A touch point may be received indicating a location of a touch by a user of the first device on the capacitive touch surface. Second orientation data may be received from a second device. The first orientation data may be correlated with the second orientation data and based on the correlation, a relative orientation of the first device to the second device may be determined. A position of a pointing device may be determined based on the touch point and the relative orientation of the first device to the second device.

According to an embodiment of the disclosed subject matter a method may include receiving a plurality of distances relative to a capacitive touch surface. Based on the plurality of distances, a position of at least one of a user's finger, hand, and arm may be determined. As a result, an interface may be arranged based on the determined position.

According to an embodiment of the disclosed subject matter a method may include receiving a plurality of distances relative to a capacitive touch surface. Based on the plurality of distances, a first position of at least one of a user's first finger, first hand, and first arm may be determined. As a result, a first action may be assigned to a first user interaction with the capacitive touch surface based on the first determined position.

An implementation of the disclosed subject matter provides a system including a processor configured to receive first orientation data associated with a first device and the first device may include a capacitive touch surface. A touch point may be received indicating a location of a touch by a user of the first device on the capacitive touch surface. Second orientation data may be received from a second device. The first orientation data may be correlated with the second orientation data and based on the correlation, a relative orientation of the first device to the second device may be determined. A position of a pointing device may be determined based on the touch point and the relative orientation of the first device to the second device.

An implementation of the disclosed subject matter provides a system including a processor configured to receive a plurality of distances relative to a capacitive touch surface. Based on the plurality of distances, a position of at least one of a user's finger, hand, and arm may be determined. As a result, an interface may be arranged based on the determined position.

An implementation of the disclosed subject matter provides a system including a processor configured to receive a plurality of distances relative to a capacitive touch surface. Based on the plurality of distances, a first position of at least one of a user's first finger, first hand, and first arm may be determined. As a result, a first action may be assigned to a first user interaction with the capacitive touch surface based on the first determined position.

In an implementation, a system according to the disclosed subject matter includes means for receiving orientation data associated with a device having a capacitive touch interface, means for receiving a touch point indicating a touch location on the interface, means for receiving second orientation data from a second device, and means for correlating the first orientation data with the second orientation data. Based on the correlation, the system may also include means for determining a relative orientation of the first device to the second device and means for determining a position of a pointing device based on the touch point and the relative orientation of the first device to the second device.

In an implementation, a system according to the disclosed subject matter includes means for receiving a plurality of distances relative to a capacitive touch surface. Based on the plurality of distances, the system may also include means for determining a position of at least one of a user's finger, hand, and arm, and means for arranging an interface based on the determined position In an implementation, a system according to the disclosed subject matter includes means for receiving a plurality of distances relative to a capacitive touch surface. Based on the plurality of distances, the system may also include means for determining a first position of at least one of a user's first finger, first hand, and first arm and means for assigning a first action to a first user interaction with the capacitive touch surface based on the first determined position Implementations of the disclosed subject matter provide techniques for determining the handedness of a user as well as the orientation and location of a user's finger(s), hand, and/or arm on a touchscreen device. This information can be useful for a variety of interesting implementations in applications that are being used on the touchscreen device. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
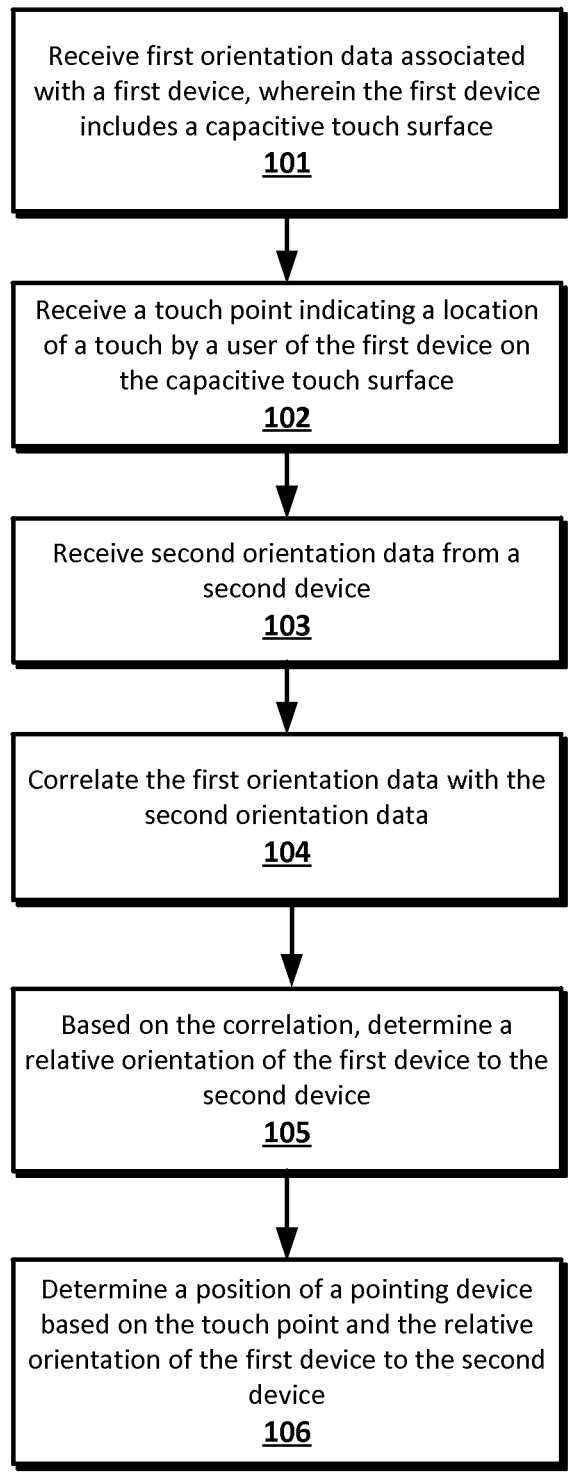
FIG. 1 shows an example process according to an implementation of the disclosed subject matter.

When a user interacts with a touchscreen device, it can be determined which part of the touchscreen the user is touching through the capacitive properties of the touchscreen display. However, much of a user's interaction with a touchscreen remains a mystery, such as which hand is being used by the user, what is the orientation of the hand relative to the touchscreen, what portions of the display are being obscured by the user's finger, hand, arm, and the like. Knowing which hand is being used can allow for a variety of interesting implementations in applications that are being used on the touchscreen device. For example, in a drawing application, a user's right hand can be used as a paint brush, while the user's left hand can be used as a color dropper. Additionally, knowing the orientation and location of the user's finger(s), hand, and/or arm on the touchscreen can be used to determine which part of the screen is obscured, or likely to be obscured, by user's finger(s), hand, and/or arm. As a result, an interface in an application may be arranged or rearranged so that the user can easily view portions of an interface that may be obscured by the user's finger(s), hand, and/or arm see.

In general, there may be multiple ways to determine the position and orientation of a user's finger(s), hand, and/or arm relative to the screen on a touchscreen device. For example, extended capacitance of a touchscreen device having a capacitive touch surface may be used. Raw capacitive readings from the touch surface may be used to build a model for determining where the user's finger(s), hand, and/or arm based on capacitive distance readings from the capacitive touch surface of the touchscreen device. As an example, to determine the direction in which a user's finger(s) curl, the system may detect capacitive readings within approximately a 3 cm radius of a touch point received from the user on the capacitive touch surface. Similarly, to determine the area and/or direction in which the user's arm is resting, the system may detect capacitive readings within approximately a 20 cm radius of a touch point received from the user on the capacitive touch surface.

In addition to the capacitive readings for a position of a user's finger, hand, and arm from the capacitive touch surface, additional input from another device, such as a wrist-wearable device, may be used. In particular, orientation data from a touchscreen device and a wrist-wearable device may be used to determine the relative orientation of the touchscreen device to the wrist-wearable device. Each of a touchscreen device and a wrist-wearable device may include an inertial measurement unit (IMU) sensor such as a gyroscope and accelerometer. Using these IMU sensors in each device, orientation data from each device may include the one or more angles of the respective device. The system may correlate this orientation data from each device to determine the relative orientation of the two devices to one another. This relative orientation may be combined with the capacitive information regarding a touch point to determine position and orientation of a user's finger(s), hand, and/or arm relative to the screen on a touchscreen device.

A determination of which hand is being used may be made without a wrist-wearable device since the system may know which hand is being used based on the relative location of the hand on the capacitive touch surface. In situations where multiple hands may be on the capacitive touch surface, for example, the system may presume that the user is unlikely to have crossed their hands. Accordingly, a hand that is closest to the right portion of the capacitive touch surface is likely to be the user's right hand, and, similarly a hand closest to the left portion is likely to be the user's left hand. Such a technique may be performed based entirely upon the location of a touch point on the touch surface, or it may be made more sensitive by using additional capacitive information as disclosed herein, such as capacitive data that shows a portion of a user's finger, hand, or arm extending off one side of the surface.

Techniques for determining which hand is being used as disclosed herein also may be improved by using data obtained from a wrist-wearable device. For example, a user may be wearing a wrist-wearable device while interacting with the capacitive touch surface on a touchscreen device. In this case, the system may correlate the motion of the IMU sensors such as the accelerometer, gyroscope, and/or other sensors built into the wrist-wearable device with the motion of the interaction, e.g., the user's finger(s), on the capacitive touch surface on a touchscreen device. As an example, the position of each finger touch on the capacitive touch surface may be tracked over time as a touch trajectory and at the same time, the IMU sensors of the wrist-wearable device may provide second order motion (i.e., acceleration) of the wrist-wearable device. Accordingly, the system may correlate movements on the capacitive touch surface with the orientation information from the IMU sensors of the wrist-wearable device. For example, the system may differentiate the positions of each touch trajectory on the capacitive touch surface by resampling both acceleration streams (e.g., from the capacitive touch surface and the wrist-wearable device), and may correlate these positions using known correlation techniques. If the positions of each touch trajectory on the capacitive touch surface is sufficiently well-tracked to the movement detected from the wrist-wearable device (i.e., the touch trajectory on the capacitive touch surface is substantially similar to the movement detected from the wrist-wearable device), the system may determine that the touch on the capacitive touch surface may have done by the same hand on which the user is wearing the wrist-wearable device. Otherwise, the touch on the capacitive touch surface must have been done by the user's other hand.

Knowing the orientation and location of the user's finger(s), hand, and/or arm on the touchscreen and which hand is being used to interact with a touchscreen device may be used in a variety of interesting implementations in applications that are being used on the touchscreen device. Interaction techniques may take advantage of knowing which part of the screen is being obscured and also the relative position of a wrist-wearable device. For example, portions of a user interface in an application may be arranged based on the position and/or orientation of a user's finger(s), hand, and/or arm to ensure that even portions of the user interface that are obscured by the user's finger(s), hand, and/or arm. As another example, by knowing the relative position of a wrist-wearable device to the touchscreen device, relevant user feedback may be provided when, for example, data is transferred between the two devices. For example, if the wrist-wearable device is able to copy/paste content between the two devices, animations may be accurately positioned animations on the display of the touchscreen device to indicate that content is being transferred from the wrist-wearable device the touchscreen device (or vice versa). As yet another example, by knowing the handedness of an interaction received from a user on the touchscreen device, (i.e., an interaction taken by either the user's left or right hand), different actions may be assigned to an interaction from a user's left hand as opposed to the user's right hand. For example, in a drawing application, a user's dominant hand (e.g., right hand) may act as the paintbrush, while the other hand (e.g., left hand) can act like a color mixer/eye dropper tool, allowing the user to pick colors from the canvas with the left hand while drawing with the right hand.

In general, the present disclosure provides techniques for determining the position and/or orientation of a pointing device relative to the screen on a touchscreen device. FIG. 1 shows an example process according to an implementation of the disclosed subject matter. As shown, a method may include receiving first orientation data associated with a first device, at 101. The first device may include a capacitive touch surface. Examples of a device that includes a capacitive touch surface may be a tablet, a laptop, an e-reader, a smartphone, a display device, a PC, and the like. A touch point may be received indicating a location of a touch by a user of the first device on the capacitive touch surface, at 102. A location of a touch point may be in any suitable format such as a coordinate, an identification of a segment among multiple segments of a capacitive touch surface in which a touch point is located, an identification of a quadrant of a capacitive touch surface in which a touch point is located, and any other suitable format for indicating the location of a touch point on a capacitive touch surface. A capacitive touch surface may allow a user to interact with what is displayed on a device such as a touch screen device and to control how it is displayed (e.g., by zooming the text size according to a gesture on the touch surface) by touching the capacitive touch surface. A user may touch a capacitive touch surface with a pointing device such as a special stylus/pen and/or one or more fingers. In some cases, a point device may include a user's finger, hand, and/or arm. According to an implementation, a pointing device may be at least a portion of a hand of the user. At 103, second orientation data may be received from a second device. For example, a second device may be a wrist-wearable device, a wearable computer, and any other device from which orientation data may be used to determine the position and/or orientation of a pointing device relative to the screen on a touchscreen device. At 104, the first orientation data may be correlated with the second orientation data and based on the correlation, a relative orientation of the first device to the second device may be determined, at 105. Accordingly, at 106, a position of a pointing device may be determined based on the touch point and the relative orientation of the first device to the second device.

Figure 2:
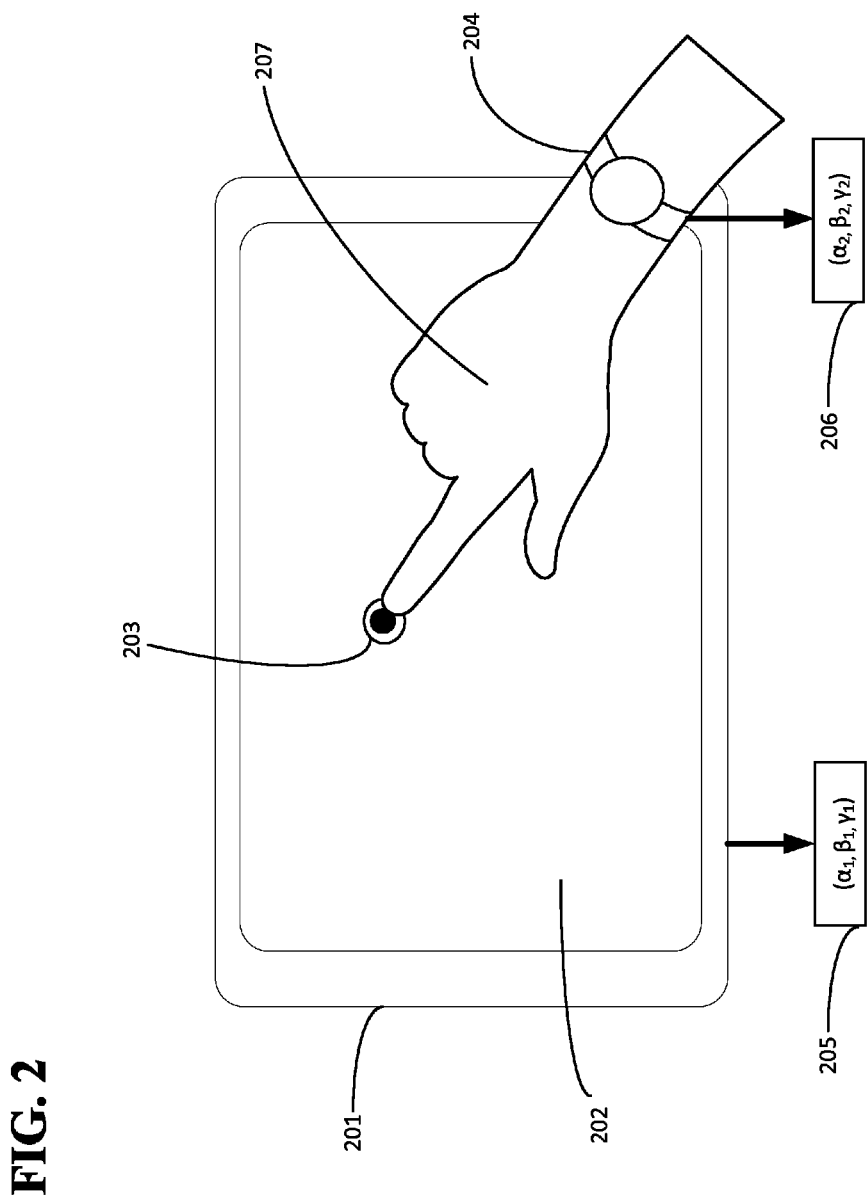
FIG. 2 shows an example system arrangement according to an implementation of the disclosed subject matter.

FIG. 2 shows an example system arrangement according to an implementation of the disclosed subject matter. A first device 201 may include a capacitive touch surface 202. First orientation data associated with a first device 201 may be received. First orientation data 205 may include an angle associated with the yaw (e.g., $\alpha_1$) of the first device 201, an angle associated with the pitch (e.g., ($\beta_1$) of the first device 201, an angle associated with the roll (e.g., $\gamma_1$) of the first device, and/or an acceleration of the first device. First orientation data 205 associated with the first device 201 may be received from one or more IMU sensors such as an accelerometer, a gyroscope, magnetometers, and the like. A touch point 203 may be received indicating a location of a touch by a user of the first device 201 on the capacitive touch surface 202. The touch point 203 may indicate x and y coordinate values based on the location of the touch point 203 on the capacitive touch surface 202. Second orientation data 206 may be received from a second device 204, such as a wrist-wearable device. Second orientation data 206 may include an angle associated with the yaw (e.g., $\alpha_2$) of the second device 204, an angle associated with the pitch (e.g., $\beta_2$) of the second device 204, an angle associated with the roll (e.g., $\gamma_2$) of the second device 204, and/or an acceleration of the second device 204. Second orientation data 206 associated with the second device 204 may be received from one or more IMU sensors such as an accelerometer, a gyroscope, magnetometers, and the like.

The first orientation data 205 ($\alpha_1, \beta_1, \gamma_1$) may be correlated with the second orientation data 206 ($\alpha_2, \beta_2, \gamma_2$). For example, based on the correlation ($\alpha_1, \beta_1, \gamma_1$) with ($\alpha_2, \beta_2, \gamma_2$), a relative orientation of the first device 201 to the second device 204 may be determined. As a result, a position of a pointing device 207 may be determined based on the touch point 203 and the relative orientation of the first device 201 to the second device 204. For example, if the second device 204 is flat on the capacitive touch surface 202, the first orientation data 205 ($\alpha_1, \beta_1, \gamma_1$) would be the same as the second orientation data 206 ($\alpha_2, \beta_2, \gamma_2$). As another example, the second orientation data 206 ($\alpha_2, \beta_2, \gamma_2$) and the first orientation data 205 ($\gamma_1, \beta_1, \gamma_1$) may indicate that the second device 204 is vertical relative to the first device 201. As a result, it may be determined that the position of a pointing device 207 is also vertical to the capacitive touch surface 202 on the first device 201. Accordingly, the orientation of the pointing device 207 relative to the capacitive touch surface 202 may be determined.

Figure 3:
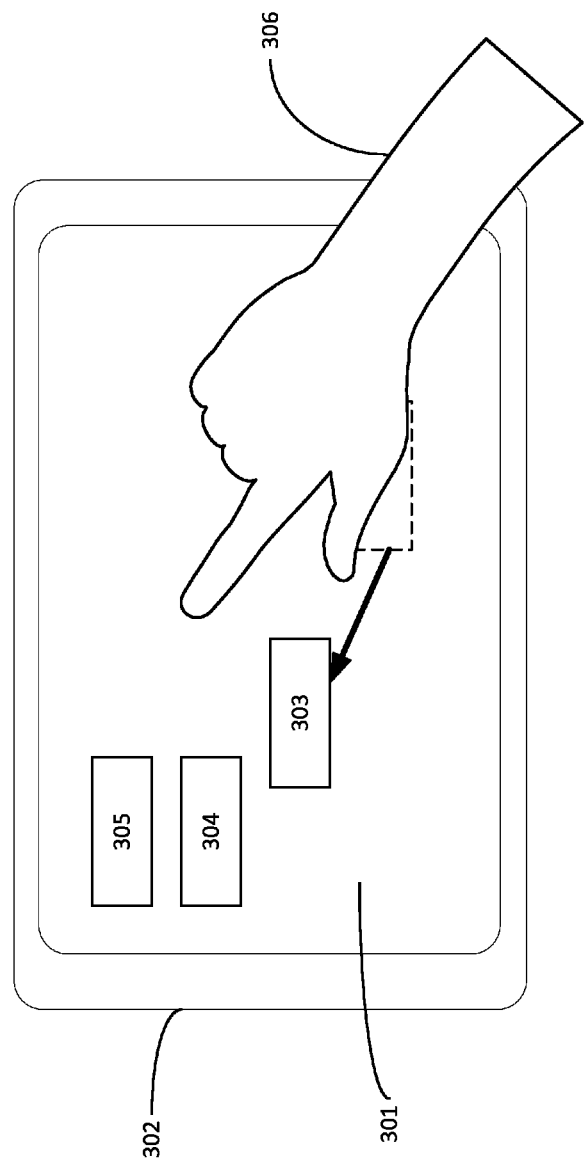
FIG. 3 shows an example system arrangement according to an implementation of the disclosed subject matter.

According to an implementation, an interface on a touch screen device may be arranged based on a position of a pointing device relative to the touch screen device. FIG. 3 shows an example system arrangement according to an implementation of the disclosed subject matter. As shown, an interface 301 including portions of the interface 303, 304, and 305 may be displayed on a touchscreen device 302. Based on the technique described above, a position of a pointing device 306 may be determined. According to an implementation, an interface may be arranged based on the determined position of a pointing device. For example, the interface 301, such as the portions of the interface 303, 304, and 305, may be arranged based on the determined position of a pointing device 306. An implementation of the disclosed subject matter includes determining a portion of the capacitive touch surface likely to be visible to the user, i.e., not overlapping a portion of the surface within which it has been determined that a pointing device is located, based upon a touch point and a position of the pointing device. In particular, at least a portion of the interface may be displayed on the portion of the capacitive touch surface likely to be visible to the user. For example, based upon a touch point and a position of the pointing device 306, it may be determined that the portions 304 and 305 of the capacitive touch surface are likely to be visible to a user. Accordingly, interface 301 may be arranged, for example by moving portion 303 of the interface as shown, such that it may be displayed on the portion of the capacitive touch surface likely to be visible to the user. An interface may be arranged by positioning, moving, rearranging, resizing, relocating, and the like, portions of the interface that may be obstructed by a pointing device, based on the touch point and/or position of the pointing device determined according to the techniques described herein.

Figure 4:
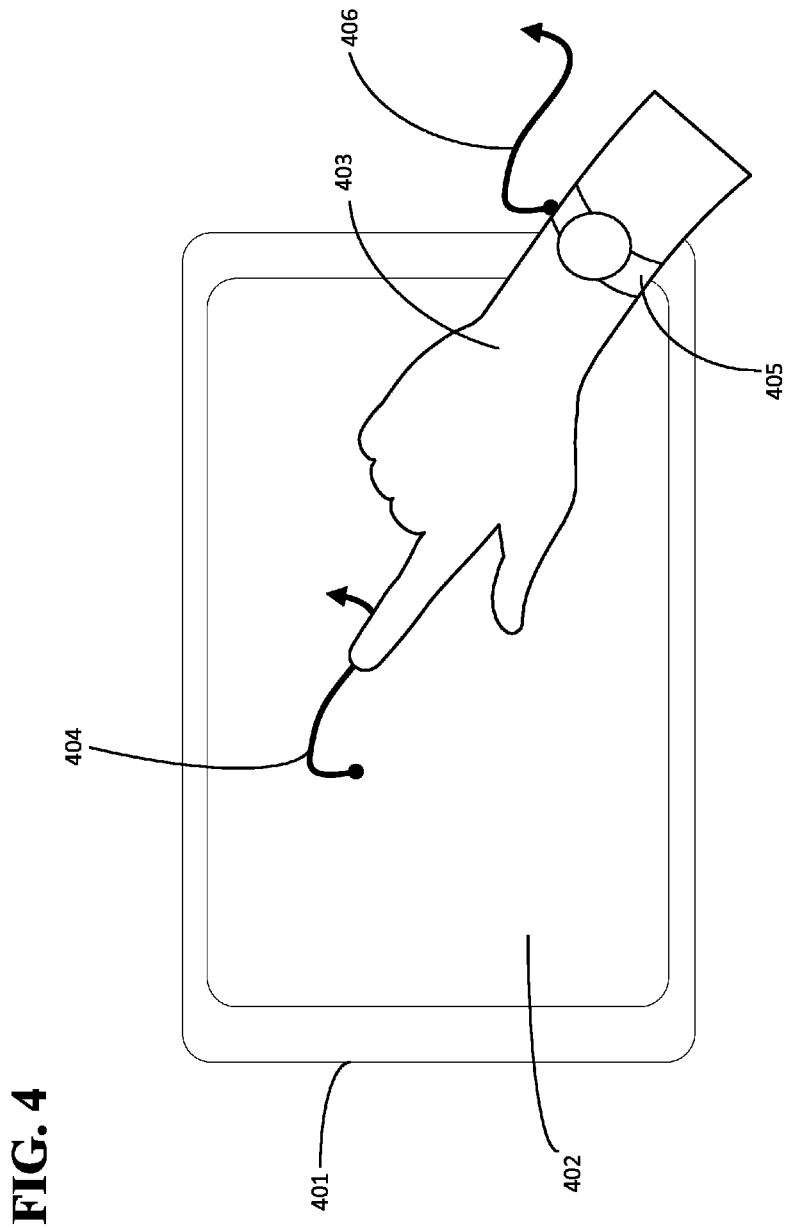
FIG. 4 shows an example system arrangement according to an implementation of the disclosed subject matter.

According to an implementation, an interface on a touch screen device may be arranged based on a position of a pointing device relative to the touch screen device. FIG. 4 shows an example system arrangement according to an implementation of the disclosed subject matter. As shown, a touchscreen device 401 may include a capacitive touch surface 402. Data may be received indicating a gesture 404 performed on the capacitive touch surface 402. Based upon the position of the pointing device 403, it may be determined whether the gesture 404 is performed by the left hand or the right hand of a user. For example, determining the position of the pointing device 403 may include correlating orientation data from the touchscreen device 401 with orientation data from the wrist-wearable device 405. In general, correlation may be a measure of the relationship between two variables or measured data values. By correlating two variables and/or measured data values, it may be determined whether the two variables/values are substantially similar to one another or not. According to an implementation, the gesture 404 received from the pointing device 403 may be correlated with orientation data, such as movement data 406, from the wrist-wearable device 405. As shown, because the trajectory of gesture 404 matches the trajectory of the movement data 406, it may be determined that the pointing device 403 corresponds with the wrist-wearable device 405, for example, the user may be wearing the wrist-wearable device on the hand that made the gesture.

In some cases, the position of one or more touch points (e.g., a gesture) received on a capacitive touch surface may be tracked over time as a trajectory. At the same time, sensors on a wrist-wearable device may provide orientation data including the motion (e.g., acceleration) of the wrist-wearable device. By differentiating the position(s) of the touch point trajectory on the capacitive touch surface, the motion data from each of the capacitive touch surface and the wrist-wearable device may be resampled and correlated using known correlation techniques. If the trajectory of the positions of the one or more touch points is sufficiently well correlated to the motion data from the wrist-wearable device, it may be determined that the gesture was made by the hand on which a user is wearing the wrist-wearable device. If not, it may be determined that the gesture was made by the user's other hand.

Figure 5:
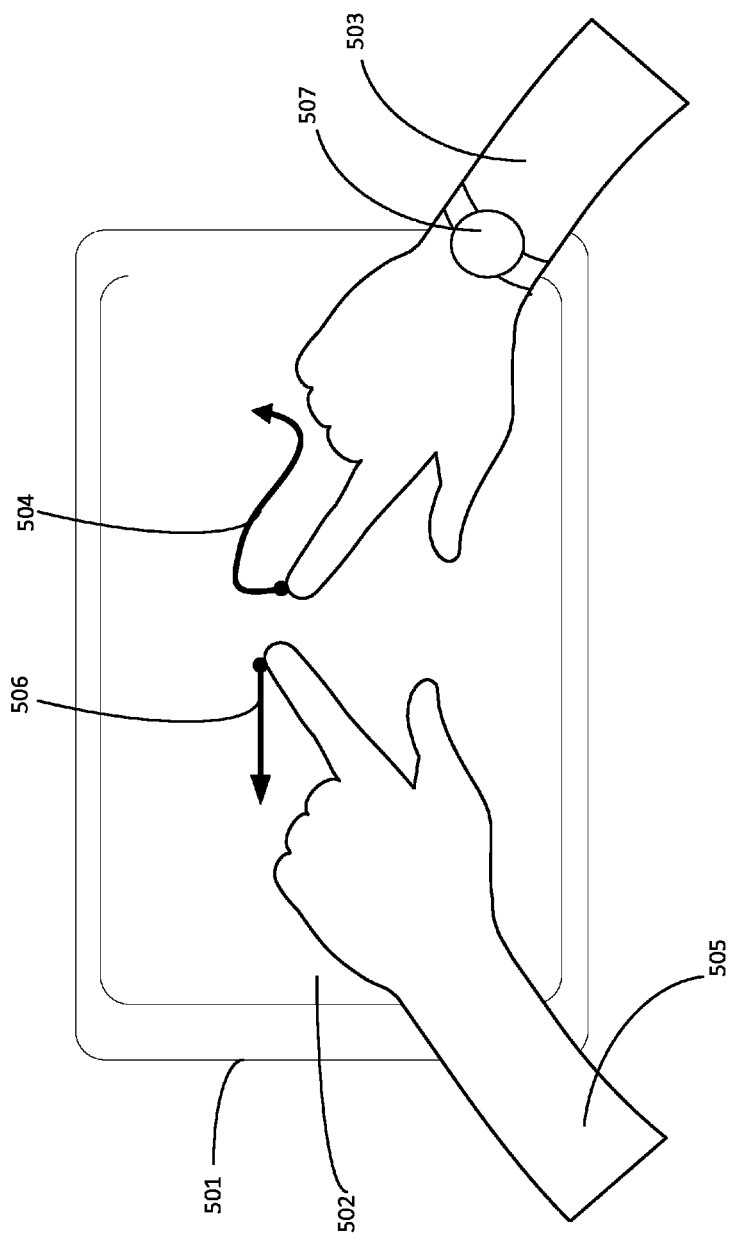
FIG. 5 shows an example system arrangement according to an implementation of the disclosed subject matter.

Following a determination as to which hand a user is using to make one or more gestures, various actions may be assigned to the right hand or the left hand of a user. FIG. 5 shows an example system arrangement according to an implementation of the disclosed subject matter. As shown, a touchscreen device 501 may include a capacitive touch surface 502. Based on the techniques described herein, it may be determined that a gesture 504 was made by a user's right hand 503 on which the user is wearing a wrist-wearable device 507. In addition, it may be determined that a gesture 506 was made by a user's left hand 505. According to an implementation, an action may be assigning to a user interaction with the capacitive touch surface based on the determined position of the pointing device. For example, because gesture 504 was made by a user's right hand 503, a particular action may be taken in an application. Similarly, because gesture 506 was made by a user's left hand 505, a different action may be taken in the application. According to an implementation, one of a first operation and a second operation may be performed in response to receiving the data indicating a gesture. In some cases, only the first operation may be performed when the gesture is performed by the left hand of the user. For example, in a painting application, a color may be selected from a color palette only when the particular gesture 506 is performed by the left hand of the user 505. In this case, no other actions may be performed by the user's left hand. In other cases, the first operation is performed only when the gesture is performed by the left hand of the user. For example, in the painting application, if the gesture 506 were performed by the right hand of the user, a color would not be selected from the color palette since this operation may only be performed by the left hand of the user.

Figure 6:
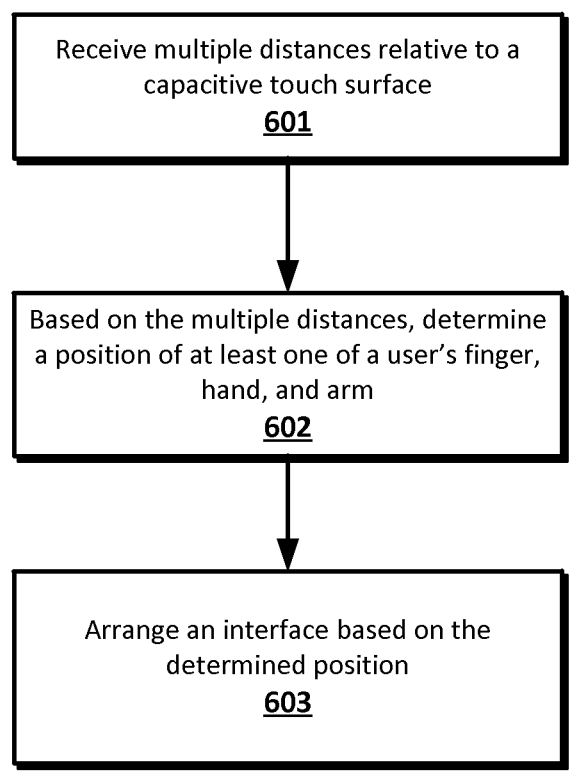
FIG. 6 shows an example process according to an implementation of the disclosed subject matter.

The present disclosure provides additional techniques for determining the position and/or orientation of a pointing device relative to the screen on a touchscreen device that may be implemented alone or in combination with other techniques described herein. FIG. 6 shows an example process according to an implementation of the disclosed subject matter. As shown, multiple distances relative to a capacitive touch surface may be received, at 601. For example, the multiple distances received may be provided in a depth map of the capacitive touch surface. In general, a depth map is an image or image channel that contains information relating to the distance of the surfaces of objects from a viewpoint. In this case, a depth map may include the multiple distances relative to the capacitive touch surface. An object which is touching the capacitive touch surface may have a relatively short distance or a distance of zero relative to the touch surface. An object which is close to the capacitive touch surface may have distance longer than the distance of an object that is touching the touch surface. Similarly, an object which is far from the capacitive touch surface may have a distance longer than the distance of an object that is close to the touch surface. Based on this depth/distance information, one or more models may be applied to determine which model best fits the data from the depth map. Based on the multiple distances, a position of a user's finger, hand, and/or arm may be determined, at 602. And as a result, an interface may be arranged based on the determined position, at 603, such as described above and as shown in FIG. 3.

In some cases, determining the position of a user's finger, hand, and/or arm may include determining the curl associated with a user's finger. Similarly, determining the position of a user's finger, hand, and/or arm may also include determining the location of the user's arm. For example, to determine the direction in which a user's finger(s) curl, capacitive readings may be detected within approximately a radius of X from a touch point received from the user on the capacitive touch surface, such as within 1-10 cm. Similarly, to determine the area and/or direction in which the user's arm is resting, capacitive readings within approximately a larger radius Y from a touch point received from the user on the capacitive touch surface, such as within 5-30 cm of the touch point. These capacitive readings may be represented as distances multiple distances relative to a capacitive touch surface and included in a depth map as described above.

Figure 7:
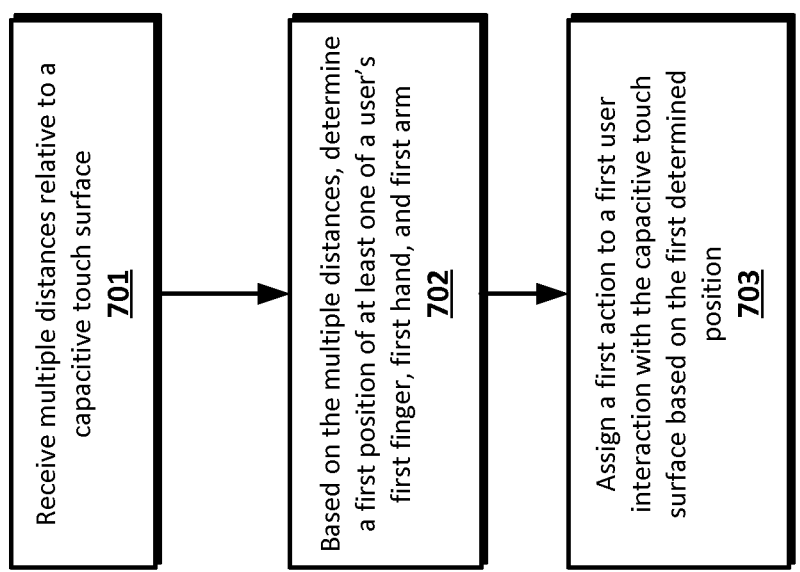
FIG. 7 shows an example process according to an implementation of the disclosed subject matter.

FIG. 7 shows an example process according to an implementation of the disclosed subject matter. Similar to the implementation described above, a method may include receiving multiple distances relative to a capacitive touch surface, at 701. Based on the multiple distances, a first position of a user's first finger, first hand, and/or first arm may be determined, at 702. As a result, a first action may be assigned to a first user interaction with the capacitive touch surface based on the first determined position, at 703. In addition, based on the multiple distances, a second position of a user's second finger, second hand, and second arm may be determined. Accordingly, a second action may be assigned to a second user interaction with the capacitive touch surface based on the second determined position. Various actions may be assigned to user interactions based on whether the user interaction (e.g., a gesture) is performed by the left or right hand of a user as described above and shown in FIG. 5.

In an implementation, communication between a first device and a second device may be across one or more bridges between the interfaces. For example, the communications between a first device and a second device may be managed or assisted by a third device, such as, a coordinating device, a local coordinator, a remote server, etc. In such cases, the third device may, for example, receive first orientation data and a touch point from a first device, and receive second orientation data from a second device. The third device may then correlate the first orientation data with the second orientation data. Based on the correlation, the third device may determine a relative orientation of the first device to the second device and determine a position of a pointing device based on the touch point and the relative orientation of the first device to the second device. In some cases, the third device may provide the position of a pointing device to the first device, in which case, the first device may take appropriate action in an application. Furthermore, more than one intermediate device may be implemented to facilitate communication between a first device and a second device.

Figure 8:
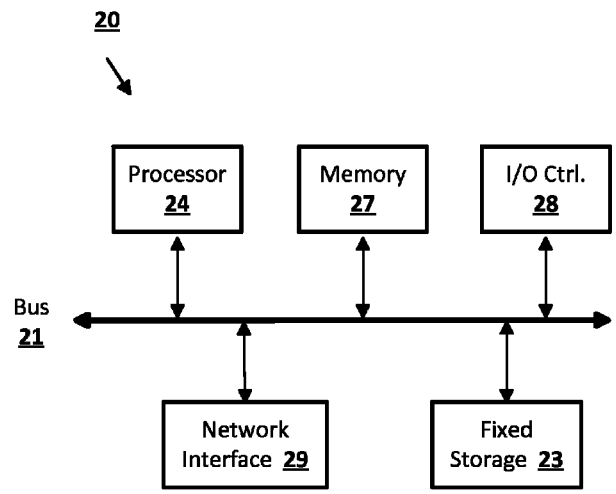
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
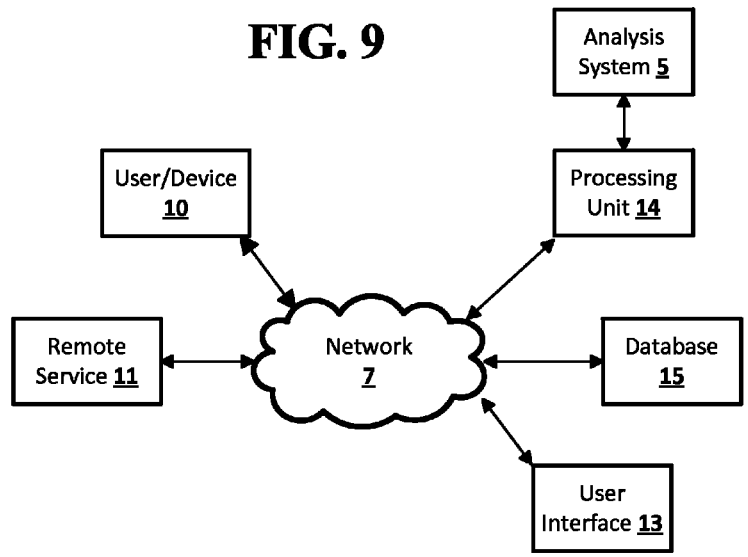
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   obtaining, by a mobile computing device, wearable device orientation data indicating a trajectory associated with a wearable device;
   obtaining data corresponding to a trajectory associated with an input that was received through a proximity-sensitive display of the mobile computing device;
   obtaining data indicating whether the wearable device is worn on a left hand or a right hand;
   generating correlation data that reflects an extent to which the trajectory associated with the wearable device correlates with the trajectory associated with the input; and
   classifying the input as a left-handed input or a right-handed input based at least on (i) the correlation data, and (ii) the data indicating whether the wearable device is worn on a left hand or a right hand.

2. The computer-implemented method of claim 1, wherein:
   the wearable device includes a wrist-wearable device;
   the proximity-sensitive display includes a capacitive touch surface; and
   obtaining data corresponding to the trajectory associated with the input that was received through the proximity-sensitive display of the mobile computing device comprises obtaining data identifying one or more of (i) a coordinate of the capacitive touch surface at which the input was received, (ii) a segment at which the input was received among multiple segments of the capacitive touch surface, and (iii) a quadrant of the capacitive touch surface where the input was received.

3. The computer-implemented method of claim 1, wherein:
   the data corresponding to the trajectory associated with the input that was received through the proximity-sensitive display of the mobile computing device includes one or more of (i) an angle associated with a yaw of the mobile computing device, (ii) an angle associated with a pitch of the mobile computing device, (iii) an angle associated with a roll of the mobile computing device, and (iv) an acceleration of the mobile computing device; and
   the wearable device orientation data includes one or more of (I) an angle associated with a yaw of the wearable device, (II) an angle associated with a pitch of the wearable device, (III) an angle associated with a roll of the wearable device, and (IV) an acceleration of the wearable device.

4. The computer-implemented method of claim 1, further comprising:
   determining a relative orientation of the mobile computing device to the wearable device based on the generated correlation data; and
   determining a position of a hand associated with the input based on (i) the determined relative orientation and (ii) the obtained data corresponding to the trajectory associated with the input that was received through the proximity-sensitive display of the mobile computing device.

5. The computer-implemented method of claim 4, further comprising:
   arranging an interface on the proximity-sensitive display based on the determined position of the hand, wherein:
   the interface is arranged by one or more of moving, resizing, and repositioning the interface; and
   the interface is arranged at a location on the proximity-sensitive display where the interface is likely to be visible to a user associated with the input.

6. The computer-implemented method of claim 1, further comprising:
   performing a first operation in the mobile computing device in response to classifying the input as a left-handed input, the left-handed input including a left-handed gesture; and
   performing a second operation in the mobile computing device in response to classifying the input as a right-handed gesture, the second operation being different than the first operation and the right-handed input including a right-handed gesture.

7. The computer-implemented method of claim 1, wherein generating correlation data that reflects an extent to which the trajectory associated with the wearable device correlates with the trajectory associated with the input comprises determining that the trajectory associated with the input matches the trajectory of the wearable device based on (i) the obtained data corresponding to the trajectory associated with the input and (ii) the trajectory associated with the wearable device orientation data; and
   wherein classifying the input as a left-handed input or a right-handed input comprises determining that the wearable device is worn on a hand associated with the classified input.

8. A non-transitory computer-readable storage medium encoded with a computer program, the computer program comprising instructions that, upon execution by a computer, cause the computer to perform operations comprising:
   obtaining wearable device orientation data indicating a trajectory associated with a wearable device;
   obtaining data corresponding to a trajectory associated with an input that was received through a proximity-sensitive display of the mobile computing device;
   obtaining data indicating whether the wearable device is worn on a left hand or a right hand;
   generating correlation data that reflects an extent to which the trajectory associated with the wearable device correlates with the trajectory associated with the input; and
   classifying the input as a left-handed input or a right-handed input based at least on (i) the correlation data, and (ii) the data indicating whether the wearable device is worn on a left hand or a right hand.

9. The non-transitory computer-readable storage medium of claim 8, wherein:
   the wearable device includes a wrist-wearable device;
   the proximity-sensitive display includes a capacitive touch surface; and
   obtaining data corresponding to the trajectory associated with the input that was received through the proximity-sensitive display of the mobile computing device comprises obtaining data identifying one or more of (i) a coordinate of the capacitive touch surface at which the input was received, (ii) a segment at which the input was received among multiple segments of the capacitive touch surface, and (iii) a quadrant of the capacitive touch surface where the input was received.

10. The non-transitory computer-readable storage medium of claim 8, wherein:
the data corresponding to the trajectory associated with the input that was received through the proximity-sensitive display of the mobile computing device includes one or more of (i) an angle associated with a yaw of the mobile computing device, (ii) an angle associated with a pitch of the mobile computing device, (iii) an angle associated with a roll of the mobile computing device, and (iv) an acceleration of the mobile computing device; and
the wearable device orientation data includes one or more of (I) an angle associated with a yaw of the wearable device, (II) an angle associated with a pitch of the wearable device, (III) an angle associated with a roll of the wearable device, and (IV) an acceleration of the wearable device.

11. The non-transitory computer-readable storage medium of claim 8, further comprising:
determining a relative orientation of the mobile computing device to the wearable device based on the generated correlation data; and
determining a position of a hand associated with the input based on (i) the determined relative orientation and (ii) the obtained data corresponding to the trajectory associated with the input that was received through the proximity-sensitive display of the mobile computing device.

12. The non-transitory computer-readable storage medium of claim 11, further comprising:
arranging an interface on the proximity-sensitive display based on the determined position of the hand, wherein:
the interface is arranged by one or more of moving, resizing, and repositioning the interface; and
the interface is arranged at a location on the proximity-sensitive display where the interface is likely to be visible to a user associated with the hand associated with the input.

13. The non-transitory computer-readable storage medium of claim 8, further comprising:
performing a first operation in the mobile computing device in response to classifying the input as a left-handed input, the left-handed input including a left-handed gesture; and
performing a second operation in the mobile computing device in response to classifying the input as a right-handed gesture, the second operation being different than the first operation and the right-handed input including a right-handed gesture.

14. The non-transitory computer-readable storage medium of claim 8, wherein generating correlation data that reflects an extent to which the trajectory associated with the wearable device correlates with the trajectory associated with the input comprises determining that the trajectory associated with the input matches the trajectory of the wearable device based on (i) the obtained data corresponding to the trajectory associated with the input and (ii) the trajectory associated with the wearable device orientation data; and
wherein classifying the input as a left-handed input or a right-handed input comprises determining that the wearable device is worn on a hand associated with the classified input.

15. A system comprising:
one or more processors and one or more computer storage media storing instructions that are operable and when executed by the one or more processors, cause the one or more processors to perform operations comprising:
obtaining wearable device orientation data indicating of a trajectory associated with a wearable device;
obtaining data corresponding to a trajectory associated with an input that was received through a proximity-sensitive display of the mobile computing device;
obtaining data indicating whether the wearable device is worn on a left hand or a right hand;
generating correlation data that reflects an extent to which the trajectory associated with the wearable device correlates with the trajectory associated with the input; and
classifying the input as a left-handed input or a right-handed input based at least on (i) the correlation data, and (ii) the data indicating whether the wearable device is worn on a left hand or a right hand.

16. The system of claim 15, wherein:
the wearable device includes a wrist-wearable device;
the proximity-sensitive display includes a capacitive touch surface;
the data corresponding to the trajectory associated with the input that was received through the proximity-sensitive display of the mobile computing device includes one or more of (i) an angle associated with a yaw of the mobile computing device, (ii) an angle associated with a pitch of the mobile computing device, (iii) an angle associated with a roll of the mobile computing device, and (iv) an acceleration of the mobile computing device;
the wearable device orientation data includes one or more of (v) an angle associated with a yaw of the wearable device, (vi) an angle associated with a pitch of the wearable device, (vii) an angle associated with a roll of the wearable device, and (viii) an acceleration of the wearable device; and
obtaining data corresponding to the trajectory associated with the input that was received through the proximity-sensitive display of the mobile computing device comprises obtaining data identifying one or more of (ix) a coordinate of the capacitive touch surface at which the input was received, (x) a segment at which the input was received among multiple segments of the capacitive touch surface, and (xi) a quadrant of the capacitive touch surface where the input was received.

17. The system of claim 15, further comprising:
determining a relative orientation of the mobile computing device to the wearable device based on the generated correlation data; and
determining a position of a hand associated with the input based on (i) the determined relative orientation and (ii) the obtained data corresponding to the trajectory associated with the input that was received through the proximity-sensitive display of the mobile computing device.

18. The system of claim 17, further comprising:
arranging an interface on the proximity-sensitive display based on the determined position of the hand, wherein:
the interface is arranged by one or more of moving, resizing, and repositioning the interface; and
the interface is arranged at a location on the proximity-sensitive display where the interface is likely to be visible to a user associated with the hand associated with the input.

19. The system of claim 15, further comprising:
performing a first operation in the mobile computing device in response to classifying the input as a left-handed input, the left-handed input including a left-handed gesture; and performing a second operation in the mobile computing device in response to classifying the input as a right-handed gesture, the second operation being different than the first operation and the right-handed input including a right-handed gesture.

20. The system of claim 15, wherein generating correlation data that reflects an extent to which the trajectory associated with the wearable device correlates with the trajectory associated with the input comprises determining that the trajectory associated with the input matches the trajectory of the wearable device based on (i) the obtained data corresponding to the trajectory associated with the input and (ii) the trajectory associated with the wearable device orientation data; and wherein classifying the input as a left-handed input or a right-handed input comprises determining that the wearable device is worn on a hand associated with the classified input.

* * * * *